United States Patent [19]
Myatt

[11] Patent Number: 5,520,231
[45] Date of Patent: May 28, 1996

[54] ELECTRONIC CIRCUIT HAVING IDENTIFICATION DEVICE UTILIZING ELECTRICALLY CONDUCTIVE AREAS OF A TIRE

[75] Inventor: David Myatt, Chateaugay, France

[73] Assignee: Compagnie Generale Des Etablissements Michelin-Michelin & Cie, Clermont-Ferrand Cedex, France

[21] Appl. No.: 258,205

[22] Filed: Jun. 10, 1994

Related U.S. Application Data

[62] Division of Ser. No. 961,383, Oct. 15, 1992, Pat. No. 5,348,067.

[30] Foreign Application Priority Data

Oct. 15, 1991 [FR] France .................................. 91 12791

[51] Int. Cl.⁶ .............................. B60C 23/04; G01D 5/12; H04L 29/00; G01L 17/00
[52] U.S. Cl. .......................... 152/152.1; 73/146; 73/146.5; 340/425.5; 340/825.54
[58] Field of Search ................................ 152/152.1, 450, 152/209 R; 340/442, 445, 825.54, 425.5; 73/146, 146.5

[56] References Cited

U.S. PATENT DOCUMENTS

| | | | |
|---|---|---|---|
| 2,118,601 | 5/1938 | Gerke et al. | 152/209 R X |
| 4,031,508 | 6/1977 | Omuri | 340/443 |
| 4,240,061 | 12/1980 | Cohen | 340/442 |
| 5,143,967 | 9/1992 | Krishnan et al. | 524/496 |
| 5,218,861 | 6/1993 | Brown et al. | 73/146.5 |

FOREIGN PATENT DOCUMENTS 56-138009 10/1981 Japan.

Primary Examiner—Michael W. Ball
Assistant Examiner—Francis J. Lorin
Attorney, Agent, or Firm—Oblon, Spivak, McClelland, Maier & Neustadt

[57] ABSTRACT

Rubber areas of a tire having electrical conductivity are used to transmit signals to an integrated circuit embedded within the thickness of the tire without relying on an inductive or capacitive coupling. An identification device conducts an electric signal to the integrated circuit through a first electrically conductive area of rubber such as a bead cover and/or the tire tread, and a responsive signal is returned to the identification device through a second electrically conductive area.

4 Claims, 6 Drawing Sheets

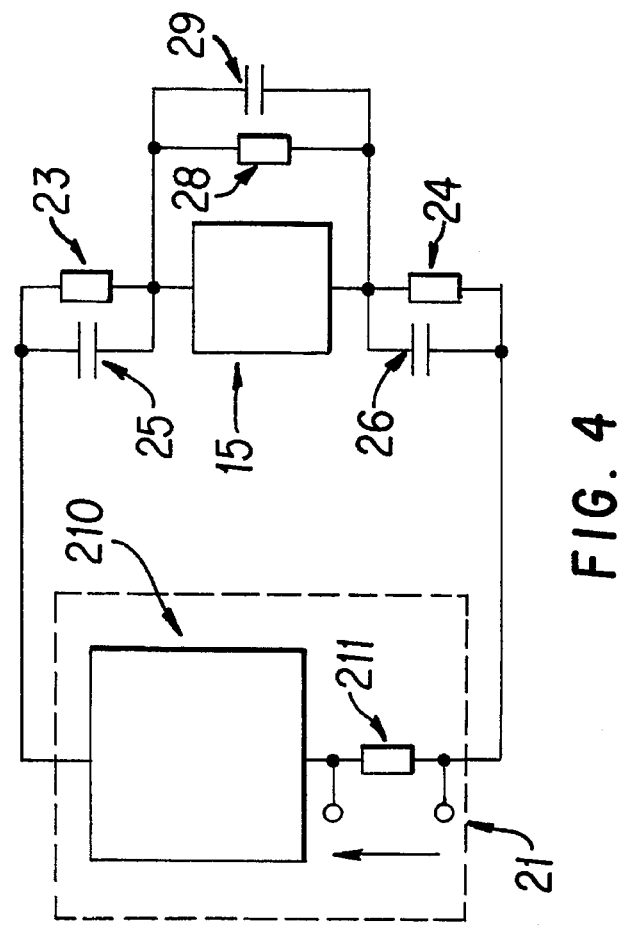
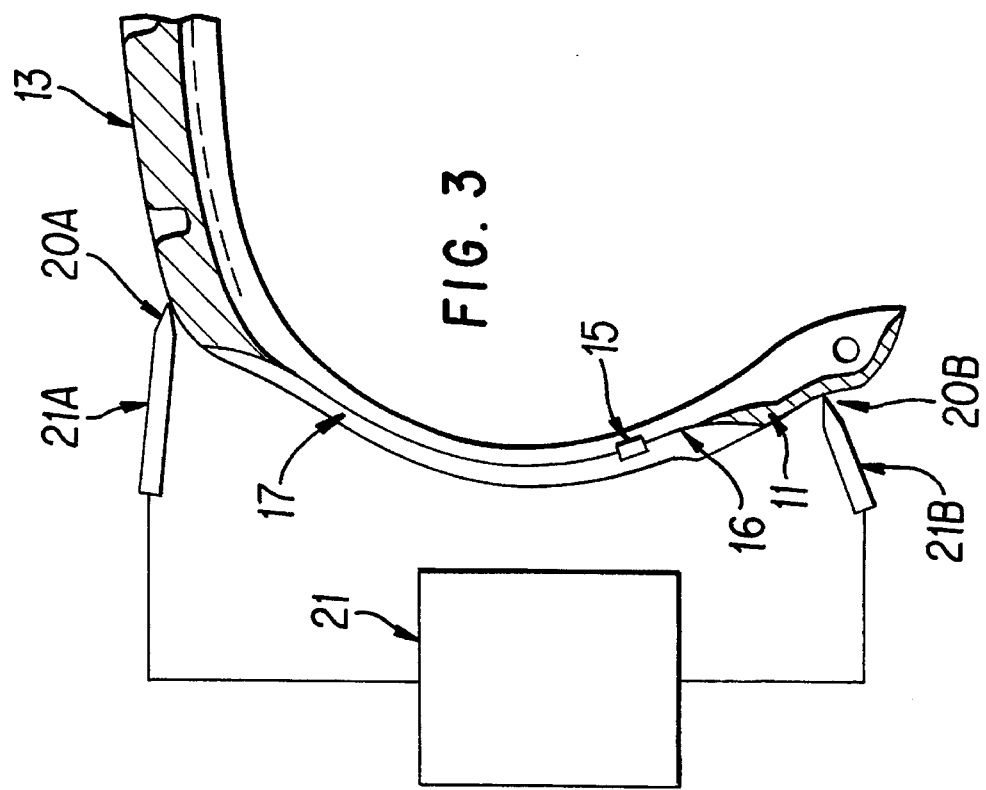

ELECTRONIC CIRCUIT HAVING IDENTIFICATION DEVICE UTILIZING ELECTRICALLY CONDUCTIVE AREAS OF A TIRE

This is a division of application Ser. No. 07/961,383, filed on Oct. 15, 1992, now U.S. Pat. No. 5,348,067.

BACKGROUND OF THE INVENTION

1. Field of the Invention

This invention relates to the installation of an electronic circuit inside the structure of a tire, allowing, for example, a simple and economical method for identifying or monitoring the tire.

2. Discussion of Background

A transponder integrated circuit installed inside a tire to identify it has already been described in U.S. Pat. No. 4,911,217. This patent explains that it has already been proposed to use identification transponders that are installed inside tires and coupled inductively with the outside. This relates more particularly to the tires for a heavy truck since the cost that could be expected for transponders thus designed was too high to consider an application in the field of tires for passenger vehicles.

U.S. Pat. No. 4,911,217 describes a method for, from an integrated circuit, installing electrodes quite near a metal reinforcement structure inside a tire for a heavy truck to operate from an oscillating electric field rather than a magnetic field as was considered previously. In this way, the costly and troublesome inductive antenna is eliminated, since a capacitive coupling is used between the inquiry device and the integrated circuit installed inside the tire.

This solution, however, has a certain number of drawbacks. The first of these drawbacks is that it requires that the tire be provided with a metal reinforcement structure. This will not always be the case, and in particular the invention as it is described in the cited patent cannot be applied in a tire in which all the reinforcements would be of textile.

Another problem resides in the fact that it is difficult, in the industrial processes, to install the electrodes with great geometric precision during the production of the tire. Now, according to the teaching of that patent, "the difference in spacing for each of the two electrodes relative to a metal reinforcement element of the tire is an essential characteristic of the invention." This will prove certainly difficult to guarantee in an industrial environment during the production of the tire, especially since the installation of electrodes is performed at a time when most of the components of the tire are of raw rubber, i.e., not having a great dimensional stability, nor in general good mechanical characteristics.

Further, the invention described requires devices for identification by reading and writing, or reading only, which are technically complex, quite as complex as in the case of an inductive coupling. The costs for these inquiry devices are too high to assure a large distribution of them. It is relatively easy to have available the required high voltages (one thousand volts peak-to-peak as suggested in the patent, probably much more for inquiry devices allowing read and write), but it is more difficult to receive signals of low level and of high impedance source such as those transmitted by the transponder circuit concealed in the tire, from a capacitive antenna located outside the tire. The difficulties are still greater when it is necessary to operate inside environments that are electrically very noisy, such as production factories or a motor vehicle.

Electroconductive rubber elements placed on or buried in the tire tread or the walls for remaining static electricity are also known by patent application JP 73/057 302.

It is also known by patent FR 2 411 719 to make rubbers having a good mechanical resistance to the action of electric voltage, for the tires equipping vehicles using electric energy to move, such as trains, streetcars or subways.

To date, no use of the electrical characteristics of rubbers has been made to impart to the tires electric or electronic functions in the problem of the identification or of the monitoring of a tire, in use on a vehicle, or during its production.

The electrical conductivity of the rubber compositions used in the production of tires is mainly due to the types and to the proportions of carbon black used to charge the rubber. A tire is a very complex structure, relying in particular on different rubber composition types, which, when they are assembled and vulcanized, impart a fairly uniform appearance to the tire. Actually, the investigations of the applicant have led him to observe considerable differences in electric resistivity in the various rubber elements of the tire, even when nothing is done intentionally to influence the electrical properties of the tires, which is generally the case. FIG. 1 illustrates the valid electrical characteristics for almost all tires produced at present. Several zones in which the rubber compositions are electrically conductive are seen. They include the protective layer of the beads, called "covers" 11 and 12, and the tire tread 13 below.

Covers 11, 12 offer a fairly low electrical resistance value, in general less than 10,000 ohms, while tire tread 13 has an electrical resistance of a value typically less than 500,000 ohms. For all the other rubber elements, the measured electrical resistance is considerably higher, on the order of several M ohms ($\geq 10^6 \Omega$).

It has been found that the measured electrical resistance virtually did not depend on the distance between the measuring electrodes, at least beyond a certain distance on the order of several centimeters. This is probably due to the fact that, since all the rubber elements of the tire are rotating parts, the electrical conduction is performed by the shortest path between the two electrodes, and also by the longest path, i.e., by two paths associated electrically in parallel. Further, the electrical contact resistance between the electrode and the rubber element probably has a significant value relative to the internal resistance of the rubber element, which is also a balancing factor of the measured resistances, regardless of the locations between which the measurement is made. Further, the metal reinforcement elements of the tire, such as the crown plies and bead wires 14, undoubtedly take part also in the conduction and are also a balancing factor.

SUMMARY OF THE INVENTION

Accordingly, one object of this invention is to provide a tire which takes advantage of the differences of electrical conductivity of the various rubber components of the tire to make an electrical connection with an integrated circuit installed inside a tire.

The invention therefore proposes to perform a communication and a supply of energy by galvanic contact with an integrated circuit installed inside the tire, and thereby to make suitable electrical connections between the integrated circuit and the electrically conductive zones of rubber accessible from outside the tire. The energy exchanges between the circuit installed in the tire and the outside can therefore be assured very simply by electrical contact. A specialized circuit can be installed inside the tire to assure its identification, and to record data useful for its production or for its subsequent use. The recording of parameters, such as the operating pressure of the tire and/or the operating temperature of the tire, or else the number of rotations performed during the use of the tire, can be assured. Of course, the amounts of energy that can be exchanged by electrical conduction are much higher than what it is possible to perform by providing inductive or especially capacitive transmissions.

The tire according to the invention has elements of electrically conductive rubber that are separate from one another and separated by other elements of nonconductive rubber. It is equipped with an integrated circuit embedded in its thickness. The circuit has at least two electric poles individually connected galvanically to separate areas of electrically conductive rubber, so that, by contacting an electrode with one of the areas of conductive rubber, an electric signal can be transferred to and/or from the electric circuit.

For the use of this invention, the areas of "conductive rubber" and "nonconductive rubber" are meant to describe constituent rubber parts of the tire which, regardless of the absolute value of their electrical resistance, have electrical resistance values separated by at least one order of magnitude.

The electric circuit installed in the tire has a minimum of two contacts, but could very well have more of them depending on the number of electrically conductive zones separated from one another that are available at the surface of the tire. The installation in the tire of the electric circuit can be performed completely at the beginning of the production of the tire, so that the electric circuit can be used to identify the tire all along the production of the latter, which can be advantageous for the automation of the production process. It has actually been observed that those compositions of rubber that are electrically conductive after vulcanization are also electrically conductive before vulcanization and that the compositions of rubber which are not electrically conductive after vulcanization are also not electrically conductive before vulcanization. The dialogue with the circuit installed inside the tire can therefore be assured by galvanic contact at any time during production of the tire, which is a simple, reliable and economic way to assure the identification.

The minimum condition for this invention to be able to be applied is that the tire has at least two areas of electrically conductive rubber, i.e., having a relatively low electrical resistance, preferably on the order of several thousand ohms, separated by areas of nonconductive rubber, having as high an electrical resistance as possible, in practice an electrical resistance greater than at least one order of magnitude relative to the value cited above. It is acknowledged that the electrical conductivity characteristics shall not be changed significantly by heat, by wear, by aging or by chemical attacks, which would result in preventing the normal operation of the electronic circuit installed inside the tire.

Further, the reading or reading/writing devices used in conjunction with the invention can be designed to have an automatic control of the gain to tolerate the greatest variations of resistivity of the rubber elements of the tire and a greater variation of the contact resistances.

The integrated circuits to be installed in the tire must be compatible with the operation of the tire. They should not introduce significant local stresses which could be the cause of the beginnings of cracks or breaks. The integrated circuits should withstand the mechanical and heat stresses due to the production of the tire and the mechanical and heat stresses due to the use of the tire, and it is necessary that the protection of the electric circuit be chemically compatible with the rubber composition that surrounds it. It is also necessary that no molecular diffusion to the silicon disturbs the operation of the integrated circuit. In short, the circuit must be small, very strong and hermetically sealed. Further, this circuit must have a high impedance so that it can operate with relatively small energy exchanges, facilitating the electrical contacts inside the tire, minimizing the heat dissipation that the rubber in which it is embedded must provide and minimizing the response times of the circuit and simplifying its encapsulation.

The following description explains how this invention makes it possible to perform a simple installation of small electric circuits inside the tires, regardless of the type of reinforcement used, in particular for the casing ply (metal reinforcement or textile reinforcement). The read/write device can be very simplified by comparison with the systems using a transmission by inductive or capacitive coupling because the present read/write device does not have to be able to discern signals of very low level at reception and, at transmission, weaker energies are involved.

The circuit installed inside the tire is also considerably simplified relative to what it should be if the capacitive coupling is used (the inductive communication antenna is eliminated), or if the capacitive coupling is used (the signals received by the reading device are of higher level, making superfluous certain procedures of discrimination relative to the noise, such as detections of transmission errors).

The invention is also illustrated by an example using only an electrical contact with the tire, and therefore greatly simplifying the connections and greatly simplifying the question of the reading of dual tires mounted on a vehicle, or else also making possible an easy application to the identification of a tire selected in a stack of tires, as they are stored, for example, in production factories or else at tire merchants'. In all the latter applications, it is virtually impossible to consider an identification by a system using a capacitive or inductive coupling, because in those cases, it has been found that it will never be known with certainty with what tire the system has communicated.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 shows how an identification system is connected to a tire to activate the circuit that it contains;

FIG. 4 shows an electric circuit equivalent to the configuration illustrated by FIG. 3;

DESCRIPTION OF THE PREFERRED EMBODIMENTS

Figure 2:
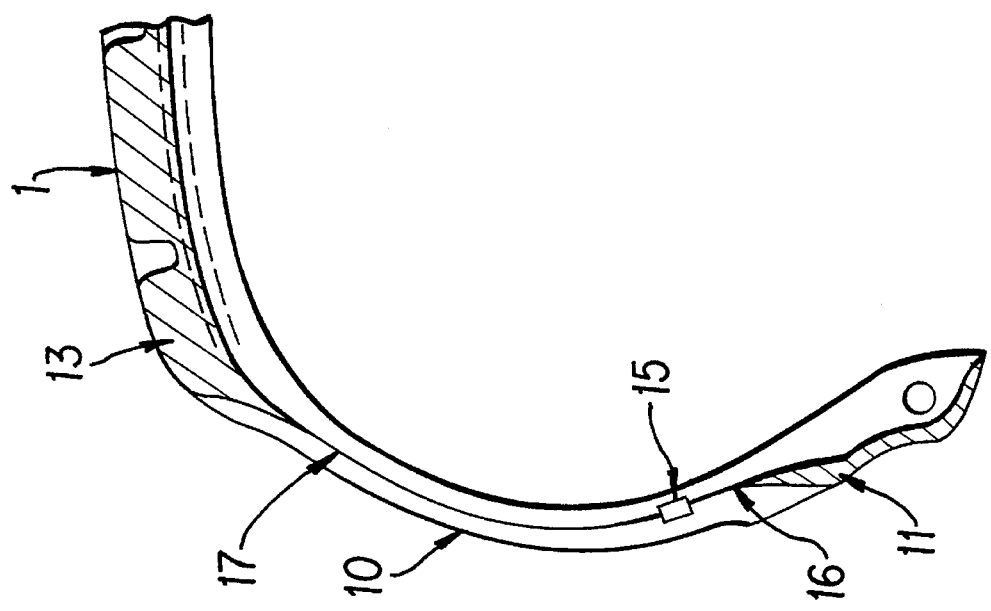
FIG. 2 shows the installation of an electronic circuit inside such a tire.
Figure 1:
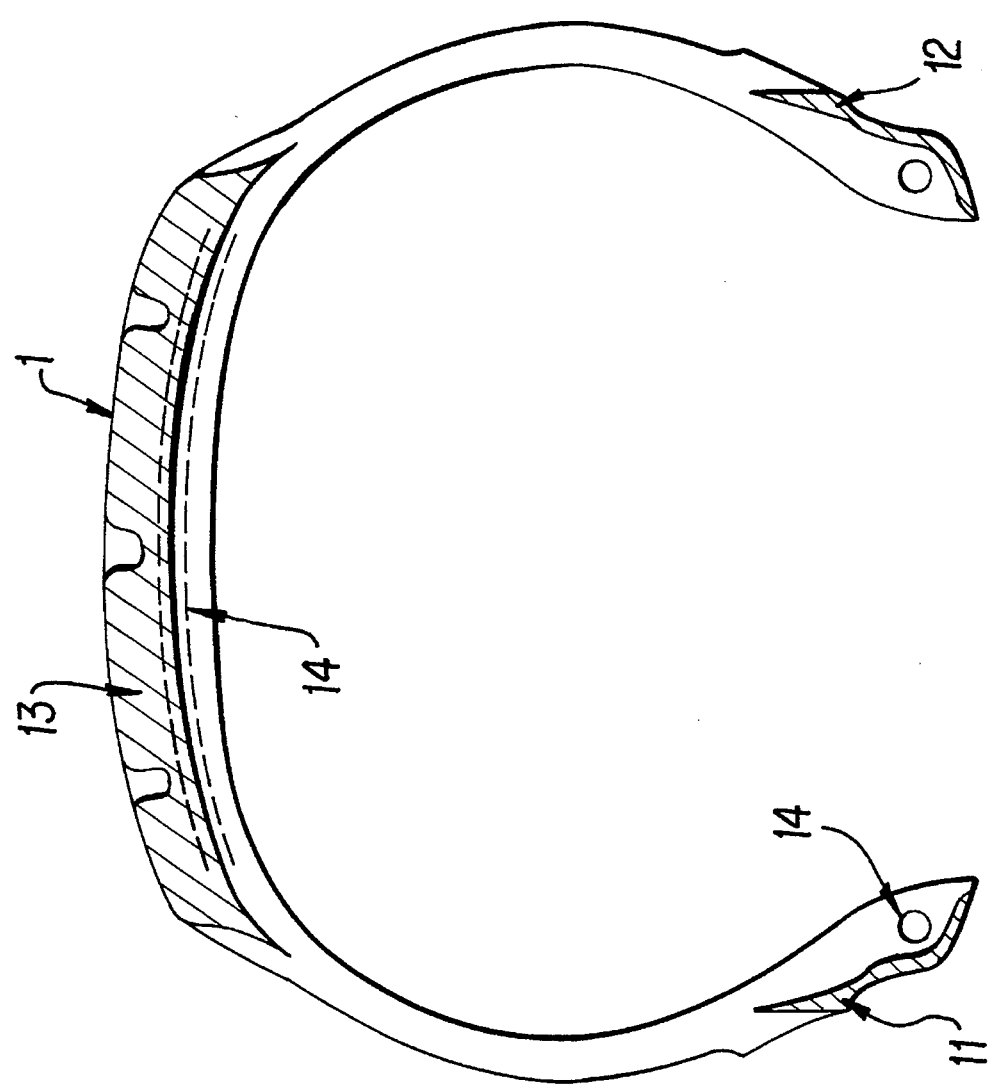
FIG. 1 is a section of a tire showing where the elements of electrically conductive rubber are.

Referring now to the drawings, wherein like reference numerals designate identical or corresponding parts throughout the several views, electronic circuit 15 shown in FIG. 2 is connected via conductive wires 16 and 17 to the elements of conductive rubber that are found in the beads, namely a cover 11, on the one hand, and to tire tread 13, on the other hand. These two connections can be made of brass-coated steel wire with high elasticity or of carbon fiber, or of an elastomer treated specifically to have a good electrical conductivity, for example. It is not necessary that wires 16 and 17 comprise an electric insulating material since they are concealed in a wall 10 of insulating rubber. Preferably, wires 16 and 17 penetrate inside cover 11 and inside tire tread 13 respectively, for at least several millimeters, and even as much as several centimeters to assure a good electrical contact. If necessary, these conductive wires are bent in the circumferential direction to assure a sufficient contact.

FIGS. 3 and 4 illustrate one of the simplest embodiments of the invention. In FIG. 3, there is seen an identification device 21 intended to communicate with the integrated circuit installed inside tire 1. This device 21 comprises means making it possible to send an electric signal to the tire and to receive an electric signal produced in response thereto as a function of the composition or of the electrical state of the integrated circuit, and it comprises two electrodes 21A and 21B intended to come in contact respectively with tire tread 13 and with cover 11.

FIG. 4 shows the equivalent electric circuit for this use. Inspection device 21 comprises a source of current or voltage 210 and an impedance 211 making possible the detection of a voltage or of a modulated current produced by circuit 15. The elements of electrically conductive rubber are represented by the association in parallel of a capacitor and a resistor. Capacitor 25 and resistor 23 represent the tire tread and capacitor 26 and resistor 24 represent the cover. The rest of the tire is represented by a resistor 28 and a capacitor 29 connected in parallel on electronic circuit 15 installed in the tire. As long as there is good insulation (high resistance 28) between the two conductive regions 23+25 and 24+26, the excitation current can be used to transfer energy to circuit 15 with good efficiency. The equivalent circuit of FIG. 4 shows that capacitors have been introduced to take into account the capacitive behavior existing when current source 210 produces an alternating signal.

During the use of the identification device, the electrical connection is made by two electrodes 21A and 21B that are supported on the tire zones that are known to consist of the electrically conductive rubber.

It can be considered as a drawback to have to make two electrical connections to the tire. This is particularly true when the tire is mounted on the vehicle or else when the region of the bead is inaccessible, such as, for example, when the tire is stored. On the other hand, the advantage of this embodiment is that the reading and writing are extremely simple and reliable allowing the use of a circuit 15 and an inspection device 21 that are extremely inexpensive, making possible in particular a direct current embodiment.

It has been found that, to continue to use the invention with tires having undergone a great aging, it is preferable that the outside electrode used to come in contact with the tire penetrates it slightly, to clear a very thin layer of rubber which can become insulating during the aging of the tire. Consequently, it is desirable that electrode or electrodes 21A, 21B comprise a tapered point 20A, 20B. The tapered points 20A, 20B also make it possible to pierce any packaging around the tire to perform a reading.

Figure 5:
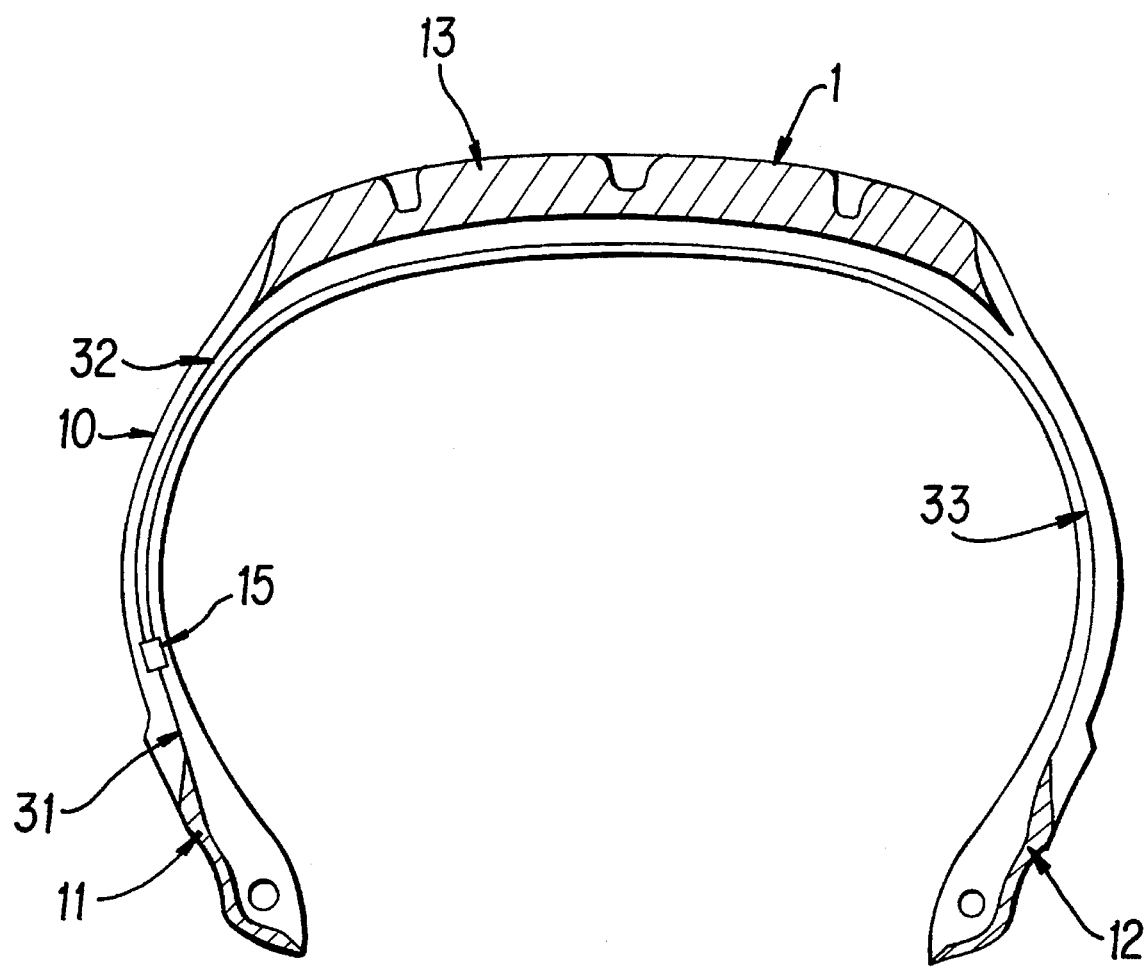
FIG. 5 shows how it is possible to install a three-pole circuit inside the tire.

FIG. 5 also shows an application which can be used in the tires as they currently exist without any modification to the latter regarding their reinforcement structure or their rubber formulation. Circuit 15 installed inside tire 1 comprises three poles, one of which is connected via wire 32 to tire tread 13, another of which is connected via wire 31 to the bead cover 11 and the third of which is connected via wire 33 to the other cover 12. It is possible, for example, to use covers 11, 12 to transfer data to circuit 15 during the production of the tire. After production, during utilization of the tire, there is danger of these two zones being short-circuited by the wheel rim, or very simply of being poorly accessible or inaccessible. In this case, only the tire tread zone is available to communicate with circuit 15.

It is clear that it is possible to add electrically conductive tones by modifying the rubber compound specifically to use this invention. For example, electrically conductive rubber zones could be added to the walls, separated from one another by zones of nonconductive rubber, to multiply the number of poles usable for communicating with circuit 15 or for using other zones of the tire.

Figure 7:
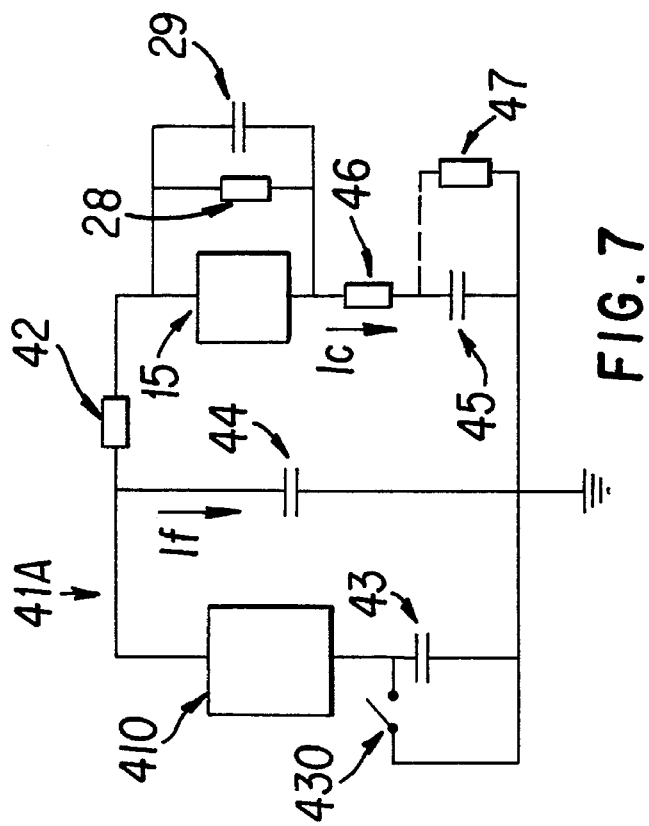
FIG. 7 shows the electric circuit equivalent to the configuration of FIG. 6.
Figure 6:
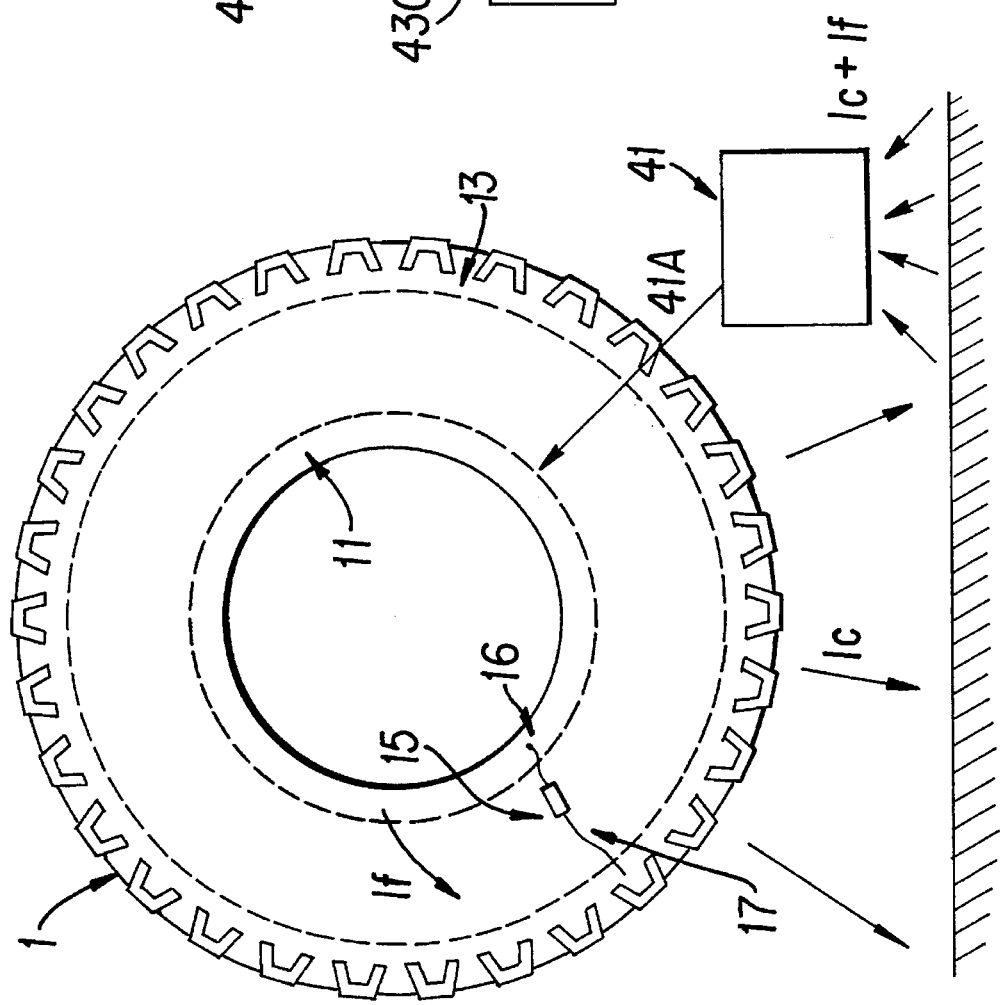
FIG. 6 shows how a circuit installed in the tire can be activated by a single connection to the bead zone.

FIGS. 6 and 7 illustrate a variant which allows the operation with a single galvanic contact with tire 1 to produce the electrical connection. This variant is suitable very particularly for producing portable inquiry device 41 summoning only a single hand of the operator to achieve the contact with the tire. Actually, the second contact is replaced by several capacitive couplings in series: the capacitive coupling existing between the second zone of electrically conductive rubber (in this case, tire tread 13) with the ground (this coupling makes possible the passage of the current symbolized by arrows $I_c$ in FIG. 6) and the capacitive coupling between inquiry device 41 and the ground. This variant, of course, calls for using an alternating signal source in inquiry device 41. In FIG. 6, there is seen integrated circuit 15 installed in tire 1, connected via conductive wire 16 to cover 11, and connected via conductive wire 17 to tire tread 13. The ground current, symbolized in FIG. 6 by arrow $I_f$, passes directly from cover 11 to the ground. In practice, it is possible to disregard the ground current passing over the wall of the tire, i.e., the current going through branch 28+29 in FIG. 7.

Inquiry device 41 comprises an electrode 41A intended to be put in direct contact with a cover. It is further in capacitive coupling with the ground, coupling making possible the passage of current $I_c+I_f$.

In FIG. 7, the electrical diagram equivalent to this configuration has been drawn. A source of current or of voltage 410 and an equivalent capacitor 43 assuring the capacitive coupling of portable inquiry device 41 with the ground are seen. In the case of a stationary device, the latter being connected to the ground, this capacitor 43 will not exist, which is diagrammed by switch 430 in parallel. Electrode 41A in capacitive coupling via stray capacitance 44 with the ground and resistor 42 corresponding to the impedance of bead cover 11 are also seen. This resistor 42 is connected electrically to one of the poles of electric circuit 15, which is connected to the ground via the branch comprising resistor 46, corresponding to the impedance of tire tread 13, capacitor 45 and resistor 47. Resistor 47 varies according to the quality of the electrical contact of tire 1 with the ground. In parallel with integrated circuit 15, a branch comprising a resistor 28 and a capacitor 29 in parallel are also found as in the preceding example. As already stated, this cause of leakage can in practice be disregarded. Current $I_c$ going through circuit 15 will be less than the current delivered by source 410, by leakages If passing through the branch comprising capacitor 44. Source 41 must therefore provide more energy to be able to excite integrated circuit 15. However, it is simpler to use a single contact between inquiry device 41 and tire 1 to be able to perform the data transfers that are desired. The selection of the excitation frequency depends on the various elements described in the equivalent model represented in FIG. 7. It is suggested that an optimal frequency is between 50 kHz and 150 kHz.

With the same inspection device 41 and the same installation of circuit 15, it would also be possible to apply electrode 41B to tire tread 13. The equivalent electrical diagram of this use is very similar to that described above and it is not necessary to describe it in further detail.

Figure 8:
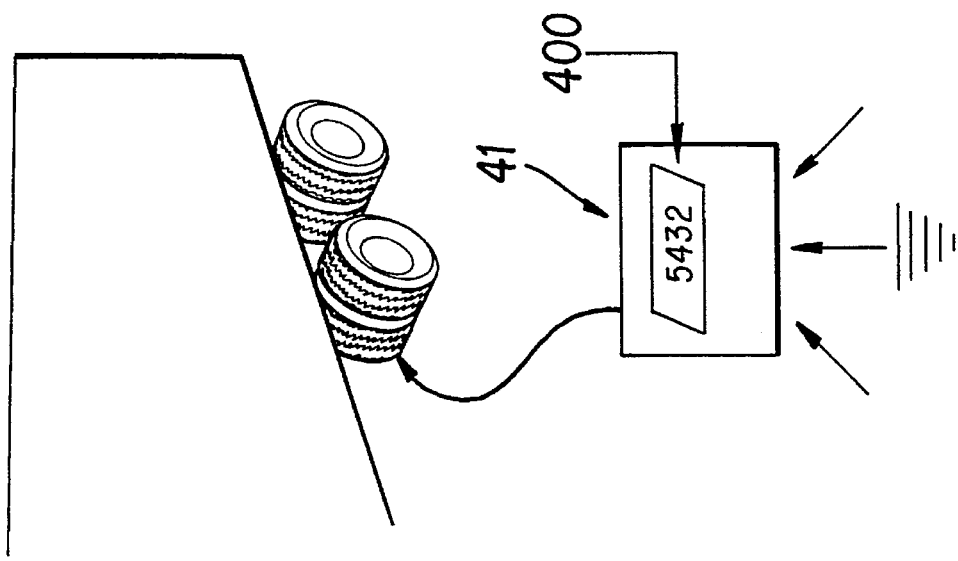
FIG. 8 shows how dual tires can be identified.

FIG. 8 shows the application of the invention to marking tires mounted dually on a trailer. Inspection device 41 used is still coupled capacitively with the ground, on the one hand, and, on the other hand, it comes in contact by way of an electrode with the tire tread of the tire selected. This example is similar to that described with the help of FIG. 6, but it differs from it in that the looping by capacitive coupling will be much greater thanks to a high coupling between the wheel and the ground by the metallic grounds of the trailer (favorable factor) and in that the contact of the tire tread with the ground is going to cause a leakage (unfavorable factor). However, experiments show that display 400 of an identification number residing in the integrated circuit buried in the inspected tire is always possible even when the entire vehicle, the tire and the ground are soaked, which is the most detrimental case.

Figure 9:
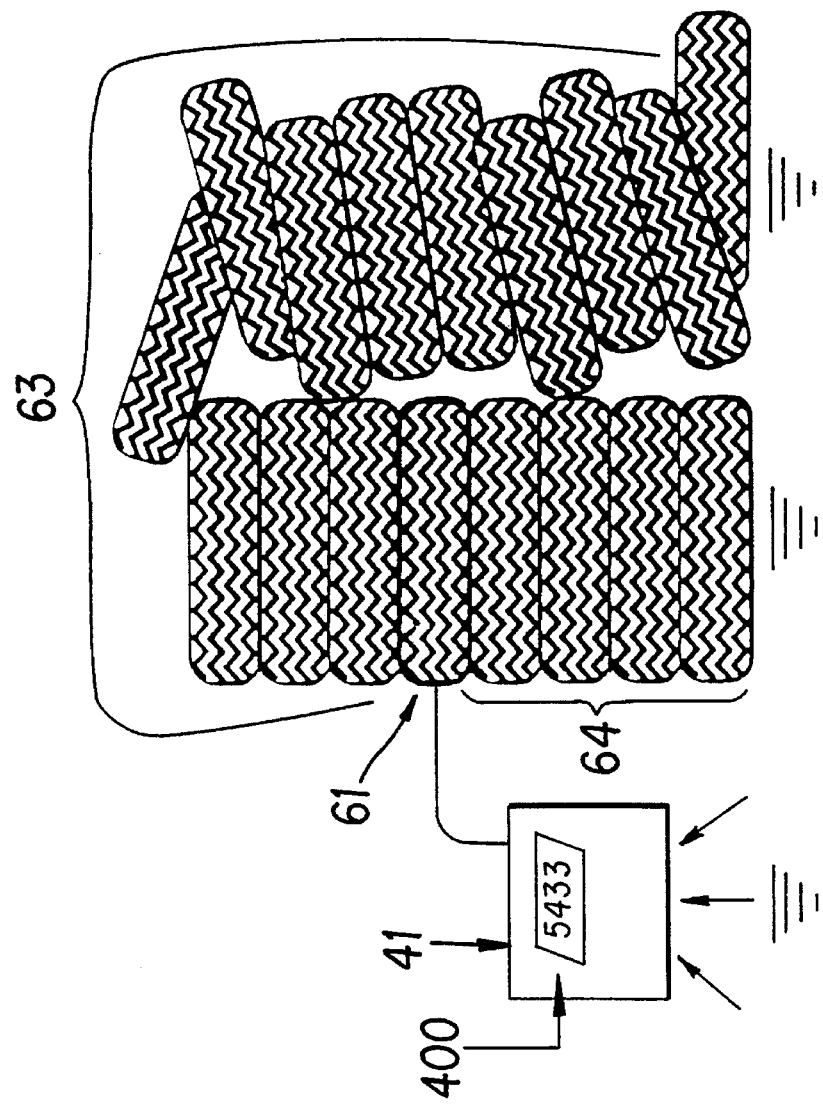
FIG. 9 shows how a tire in a storage stack can be identified.

FIG. 9 shows the application of the invention for marking tires stored in a stack. The direct contact is performed on the tire tread of tire 61. In this case, the looping by capacitive coupling is excellent thanks to the considerable capacitive grounds from tires in 63 and 64, in close capacitive coupling with the covers of tire 61. There again, display 400 of an identification number stored in the inspected tire is always possible in a very reliable manner.

In the last two examples of application of the invention, it is very particularly difficult to perform a data transfer by inductive coupling, because of the small distances available (less than the diameter of the tire) and because of the necessity of having a relatively good correspondence between the orientation of the antenna of the transponder and the antenna of the reading equipment. It must be noted that the position of the transponder in the tire will in general be unknown. Finally, in the case of application where the tires are very close to one another, there is a very strong probability that even if the antenna of the reading device is quite near a tire, even closer than it is to adjacent tires, communication is established with the electronic circuit installed in the adjacent tire, because the inductive or capacitive coupling can, despite everything, be better with the adjacent tire.

Of course, many variant embodiments can be considered. The integrated circuit that is concealed in the tire can be encapsulated in a casing 150 (FIG. 10) whose surface 151 is made conductive, for example, by metalization to constitute one of the poles of the circuit. In this case, the integrated circuit is installed in one of the elements of conductive rubber. The electric connection or the other electric connections must be made by electric wire 160, insulated by a suitable coating 161, at least when the wire leaves the casing, over a distance sufficient to assure the insulation as long as wire 160 is concealed in the same element of conductive rubber as the integrated circuit 15

Figure 11:
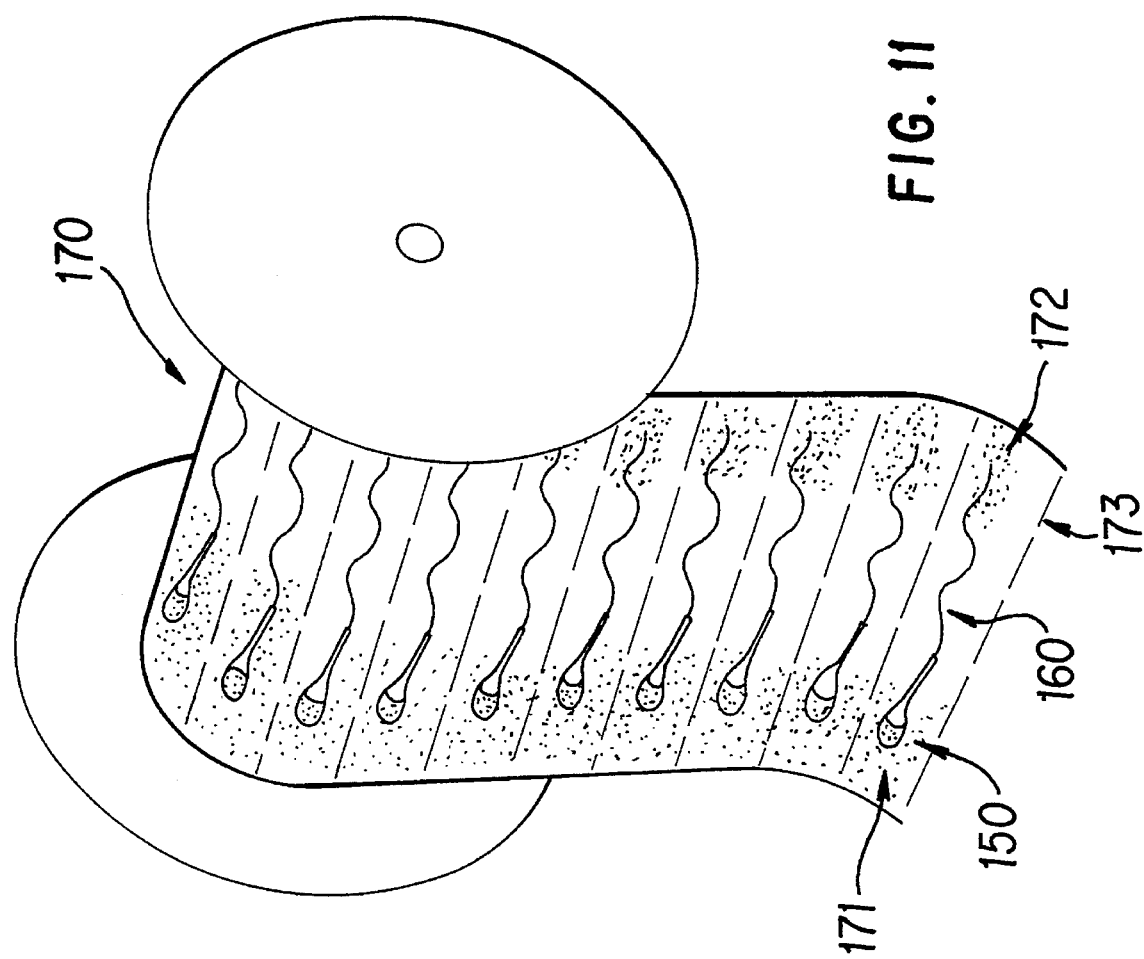
FIG. 11 shows how it is possible to package these integrated circuits of FIG. 10.
Figure 10:
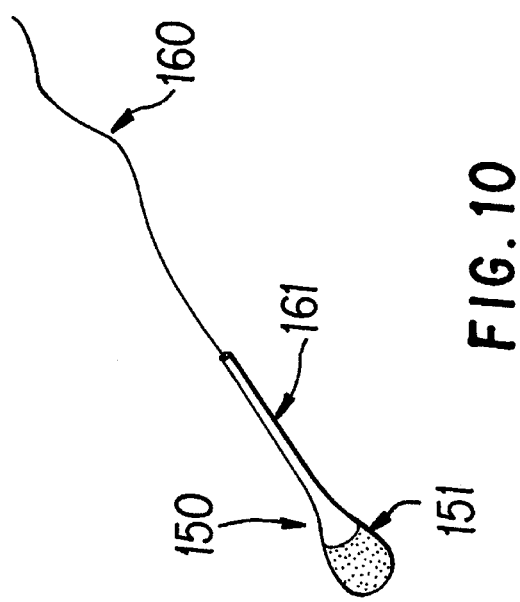
FIG. 10 shows an integrated circuit with an electric connecting wire, prepared specifically for applying to the invention.

FIG. 11 illustrates a packaging receiving the circuit of FIG. 10, designed so that the installation of the circuit in the tires can be easily performed in production shops. The unit consisting of casing 150 and connecting wire 160 is placed on a strip 173 of nonconductive rubber. Wire 160 is preferably arranged in a zigzag to lend itself to subsequent shapings occurring in the production of a tire. The whole is covered by a plastic film, and the circuits thus prepared are packaged in a reel 170, linked to one another so as to be easily separable. During the production of the tire, it is sufficient, on reel 170, to take the first available circuit, to tear away the protective plastic film, to lay the unit on the tire during production so that ends 171 and 172 are glued at the level of the respective elements with which it is desired to make an electrical connection. Then, casing 150 is covered, for example, with a cover, and the opposite end of wire 160, for example, with the tire tread. The subsequent operations of stitching and molding assure a close electric contact between the elements of conductive rubber and the electrical elements thus buried in the thickness of the tire.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An identification device for a tire having an area of electrically conductive rubber and further having an integrated circuit embedded in the tire such that an electric pole of the integrated circuit is connected to the area of electrically conductive rubber, comprising:

means for sending an electric signal to the integrated circuit in the tire;

means for receiving an electric signal generated by the integrated circuit in the tire as a function of a characteristic of the integrated circuit; and at least one electrode, electrically connected to one of said means for sending and said means for receiving, and directly electrically contactable with the area of electrically conductive rubber for electrically communicating the one of said means for sending and said means for receiving with said integrated circuit.

2. The identification device of claim 1 wherein said electrode comprises a tapered point.

3. An identification device for a tire having at least two areas of electrically conductive rubber, said at least two areas of electrically conductive rubber being electrically insulated from one another, and further having an integrated circuit embedded in the tire such that an electric pole of the integrated circuit is connected to each of said at least two areas of electrically conductive rubber, comprising:

means for sending an electric signal to the integrated circuit in the tire;

a first electrode electrically connected to said means for sending, and directly electrically contactable with one of the areas of electrically conductive rubber for electrically communicating the means for sending with said integrated circuit;

means for receiving an electric signal generated by the integrated circuit in the tire as a function of a characteristic of the integrated circuit; and a second electrode electrically connected to said means for receiving, and directly electrically contactable with another of the areas of electrically conductive rubber for electrically communicating the means for receiving with said integrated circuit.

4. The identification device of claim 3 wherein said electrodes each comprise a tapered point.

* * * * *